(No Model.)
W. H. BROCK.
CHAIN.
No. 411,575. Patented Sept. 24, 1889.
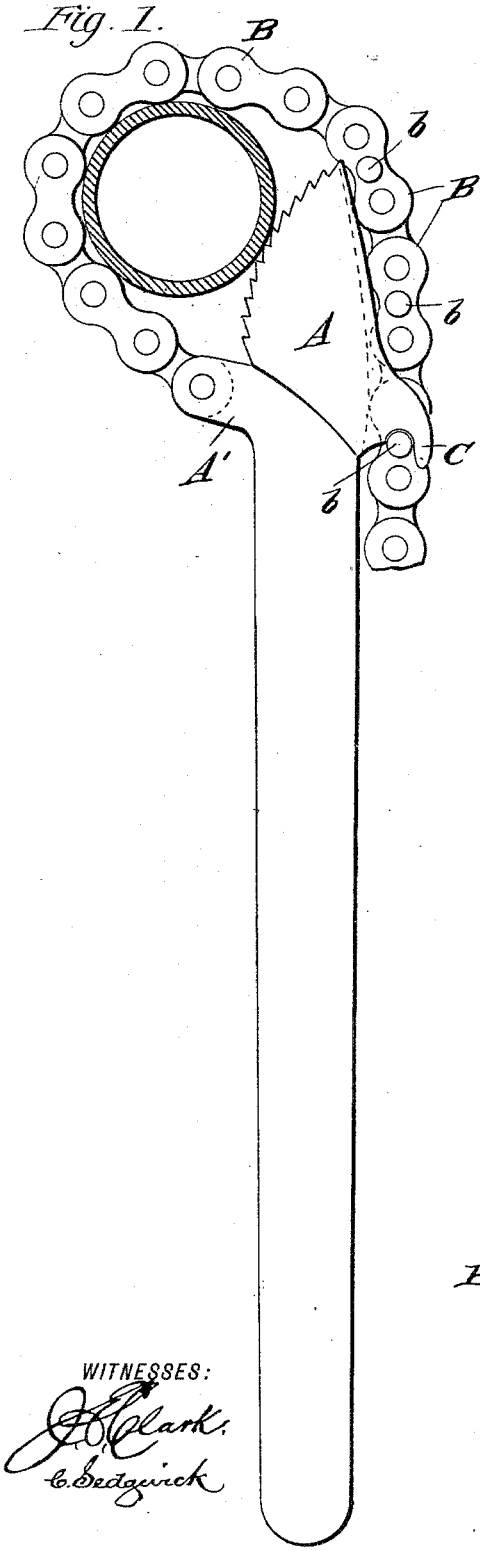
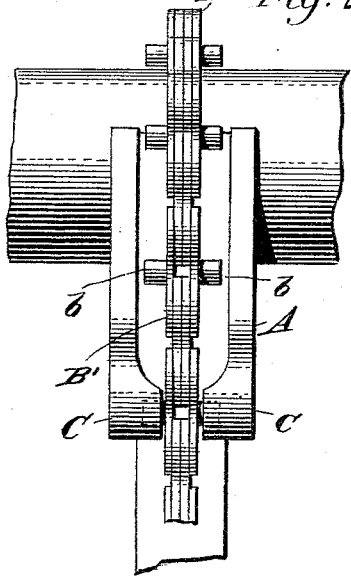
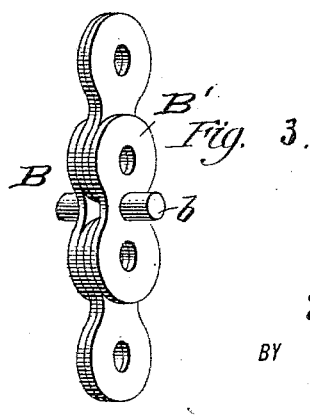
WITNESSES:
J. H. Clark
C. Sedgwick
INVENTOR:
W. H. Brock
BY Munn & Co.
ATTORNEYS.

UNITED STATES PATENT OFFICE.

WILLIAM H. BROCK, OF BROOKLYN, NEW YORK.

CHAIN.

SPECIFICATION forming part of Letters Patent No. 411,575, dated September 24, 1889.

Application filed September 18, 1888. Serial No. 285,691. (No model.)

*To all whom it may concern:*

Be it known that I, WILLIAM H. BROCK, of Brooklyn, in the county of Kings and State of New York, have invented a new and Improved Chain, of which the following is a full, clear, and exact description.

The invention consists in the features of novelty hereinafter described, and pointed out in the claims.

Reference is to be had to the accompanying drawings, forming a part of this specification, in which similar letters of reference indicate corresponding parts in all the figures.

Figure 1 is a side view of a chain-wrench, the chain of which is constructed in accordance with my invention. Fig. 2 is a partial back or top view thereof, and Fig. 3 is a perspective view of a section of my new and improved chain.

I have shown my improved chain in connection with a chain-wrench, its special object being to overcome the defects in such chains, although useful for other purposes.

The chain B may be formed of one and two links alternately, as shown, or two and four links, or otherwise, as desired, the essential feature in all cases being that the outer links B' of the chain have studs *b* formed thereon, or rigidly secured thereto, to project from the outer face of the links, preferably at the center, and to project at a right angle or approximately so. The stud projections, it will be seen, are carried by individual links on each side of the chain, and are thus separate from the studs on the opposite side.

In the chains of chain-wrenches only those outer links near the free end may be constructed with studs, the remainder of the chain being of plain links. Near the ends of the links are formed the usual holes for receiving the rivets that unite the several links.

The wrench shown in the drawings is included for the purpose of illustrating one of the uses of the improved chain. It includes the body A, having a toothed jaw or shoe, as usual, and the chain B, secured at one end to the under side of the body A, back of the shoe, between the cheek-pieces A', and the wrench-head is formed at the back or top with suitable projections or ears C, for engaging the studs of the chain in the recesses formed on their under side, as shown.

I am aware that chains for chain-wrenches have been made in which the rivets that unite the links are projected beyond the same to be engaged by suitable devices or projections on the back of the wrench. This projecting of the rivets makes the links of the chain liable to lateral separation under strain, the slight upsetting of the projected rivets being insufficient to withstand the strain.

In my improved chain the rivets are utilized for their own purpose only, and being of the usual button-head form they perform their functions as rivets to the best possible advantage; also, the stud projections are designed and employed solely for their own purpose, instead of being required to perform the additional office of rivets.

Having thus described my invention, what I claim as new, and desire to secure by Letters Patent, is—

1. A chain formed of flat links riveted together and having lateral studs projecting from the outer faces thereof intermediate the riveted ends, substantially as described.

2. As a new article of manufacture, a chain formed of flat links riveted together, the outer links being provided with laterally-projecting studs between their riveted ends, substantially as described.

3. As a new article of manufacture, a flat chain-link apertured at each end for receiving rivets, and having a rigid stud projecting from one of its flat faces intermediate said apertures, the opposite flat face being plain, substantially as described.

WILLIAM H. BROCK.

Witnesses:
J. L. McAULIFFE,
C. SEDGWICK.